United States Patent
Lee et al.

(10) Patent No.: US 11,614,132 B1
(45) Date of Patent: Mar. 28, 2023

(54) APPARATUS OF CONTROLLING TWIN CLUTCH AND METHOD THEREOF

(71) Applicants: Hyundai Motor Company, Seoul (KR); Kia Corporation, Seoul (KR); Hyundai Wia Corporation, Changwon-si (KR)

(72) Inventors: Taewoo Lee, Suwon-si (KR); Jeong Won Song, Hwaseong-si (KR); Sung Keun Lim, Hwaseong-si (KR); JunSeok Park, Seoul (KR); Pu Reun Lee, Seoul (KR); Jong Chan Lee, Hanam-si (KR); Heon Kang, Hwaseong-si (KR)

(73) Assignees: Hyundai Motor Company, Seoul (KR); KIA CORPORATION, Seoul (KR); HYUNDAI WIA CORPORATION, Changwon-si (KR)

( * ) Notice: Subject to any disclaimer, the term of this patent is extended or adjusted under 35 U.S.C. 154(b) by 0 days.

(21) Appl. No.: 17/947,833

(22) Filed: Sep. 19, 2022

(30) Foreign Application Priority Data

Nov. 9, 2021 (KR) .......... 10-2021-0152841

(51) Int. Cl.
*F16D 48/06* (2006.01)
(52) U.S. Cl.
CPC .......... *F16D 48/066* (2013.01); *F16D 48/062* (2013.01); *F16D 2500/10412* (2013.01); *F16D 2500/10425* (2013.01); *F16D 2500/30421* (2013.01); *F16D 2500/50287* (2013.01); *F16D 2500/7044* (2013.01); *F16D 2500/70406* (2013.01); *F16D 2500/70626* (2013.01); *F16D 2500/70631* (2013.01)

(58) Field of Classification Search
None
See application file for complete search history.

(56) References Cited

U.S. PATENT DOCUMENTS

| | | | | |
|---|---|---|---|---|
| 5,680,917 A | * | 10/1997 | Bray | F16D 48/066 |
| | | | | 192/48.609 |
| 8,900,086 B2 | * | 12/2014 | Asano | F16D 48/066 |
| | | | | 475/233 |
| 11,333,208 B1 | * | 5/2022 | Kumar | B60K 17/165 |

(Continued)

*Primary Examiner* — Timothy Hannon
(74) *Attorney, Agent, or Firm* — Morgan, Lewis & Bockius LLP

(57) ABSTRACT

An apparatus of controlling a twin clutch includes: a twin clutch that selectively blocks power supplied from a drive motor to a pair of drive wheels of a vehicle; and a clutch controller that is configured to control the twin clutch by determining target torques applied to respective clutches included in the twin clutch, based on the straight-line driving state detected by the driving information detection unit, determining a correction error based on a difference between actual torques applied to the respective clutches included in the twin clutch when a preliminary activation signal, which is determined based on the target torques, is turned on and a main activation signal, which is determined based on the actual torques applied to the respective clutches, is turned on, determining a balancing control compensation amount based on the correction error, and determining a final control amounts applied to the respective clutches based on the balancing control compensation amount.

16 Claims, 5 Drawing Sheets

(56) References Cited

U.S. PATENT DOCUMENTS

| | | | | |
|---|---|---|---|---|
| 2005/0064993 A1* | 3/2005 | Ginther | ............... | B60K 23/04 |
| | | | | 477/166 |
| 2006/0254845 A1* | 11/2006 | Baasch | ............... | B60K 17/02 |
| | | | | 180/233 |
| 2008/0277240 A1* | 11/2008 | Kato | ............... | F16D 48/066 |
| | | | | 192/85.54 |
| 2017/0261049 A1* | 9/2017 | Nozu | ............... | F16D 25/08 |
| 2018/0134154 A1* | 5/2018 | Shimizu | ............... | F16D 21/08 |
| 2021/0261115 A1* | 8/2021 | Niessen | ............... | F16D 48/06 |

\* cited by examiner

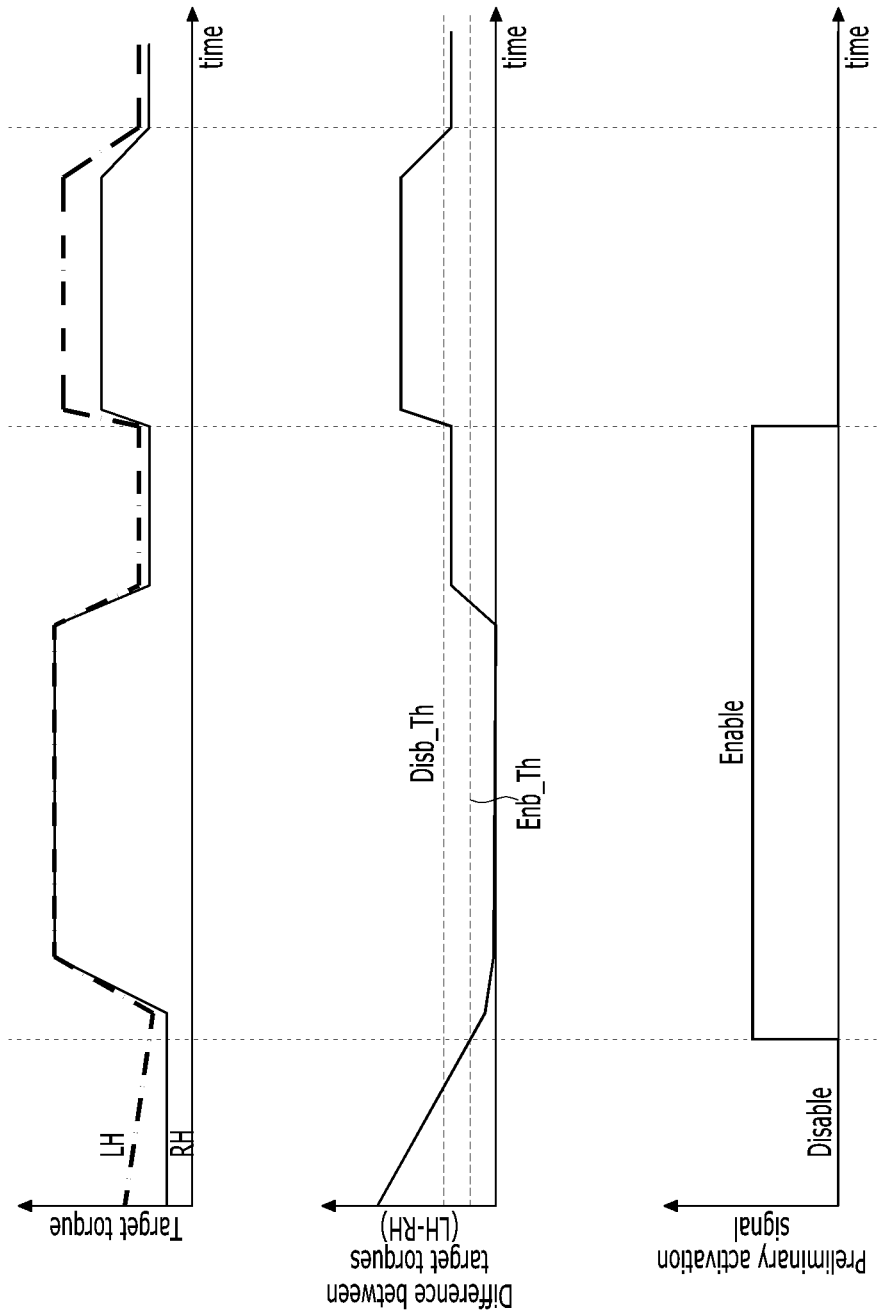

APPARATUS OF CONTROLLING TWIN CLUTCH AND METHOD THEREOF

CROSS-REFERENCE TO RELATED APPLICATION

The present application claims priority to Korean Patent Application No. 10-2021-0152841 filed on Nov. 9, 2021, the entire contents of which is incorporated herein for all purposes by this reference.

BACKGROUND OF THE PRESENT DISCLOSURE

Field of the Present Disclosure

The present disclosure relates to an apparatus of controlling a twin clutch and a method thereof, and more particularly, an apparatus of controlling a twin clutch, which may improve a straight-line driving performance of a vehicle by supplementing a response performance of the clutch caused by a deviation of components, and a method thereof.

DESCRIPTION OF RELATED ART

In general, a rear-wheel drive (RWD) vehicle is a vehicle which may shift power generated from a drive source by use of a transmission and transmit the same to a rear axle by use of a propeller shaft. The RWD vehicle may be easily drifted due to a small turning radius, and have an improved grip as the vehicle is accelerated because a center of gravity is moved toward its rear wheel during a rapid acceleration when having a good handling performance.

Furthermore, a four-wheel drive (4WD) vehicle or an all-wheel drive (AWD) vehicle may distribute the power generated from the drive source to four wheels to increase a rotation force of each wheel, thus showing an excellent driving performance on an uneven, snowy, icy or muddy road or the like.

Accordingly, the RWD, 4WD or AWD vehicle may include a hydraulic clutch apparatus of distributing a drive torque generated from the drive source to the rear wheels or all wheels, and the hydraulic clutch apparatus may be provided on a drive line between a front axle and the rear axle or on a rear axle.

The recent RWD, 4WD or AWD vehicle may use a twin clutch which may independently control the power generated from the drive source by including left and right clutches respectively provided in the rear axle to improve its handling and traction performances.

The twin clutch may be provided with various components such as a hydraulic pump, a piston and a gear, and a difference in the response performances of the clutch may occur depending on a deviation of the respective components.

When the difference occurs in the response performance of the clutch due to the deviation of the components, the present difference may affect a movement of the vehicle when uniform torques are required to be applied to the left and right clutches, such as in a straight-line driving.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an apparatus of controlling a twin clutch, which may improve a straight-line driving performance of a vehicle by use of a deviation of components included in the twin clutch, and a method thereof.

According to various exemplary embodiments of the present disclosure, an apparatus of controlling a twin clutch includes: a twin clutch that selectively blocks power supplied from a drive motor to a pair of drive wheels of a vehicle; a driving information detection unit that is configured to detect a straight-line driving state of the vehicle; and a clutch controller that is configured to control the twin clutch by determining target torques applied to respective clutches included in the twin clutch, based on the straight-line driving state detected by the driving information detection unit, determining a correction error based on a difference between actual torques applied to the respective clutches included in the twin clutch when a preliminary activation signal, which is determined based on the target torques, is turned on and a main activation signal, which is determined based on the actual torques applied to the respective clutches, is turned on, determining a balancing control compensation amount based on the correction error, and determining final control amounts applied to the respective clutches based on the balancing control compensation amount.

The balancing control compensation amount may be determined applying one or more of proportional control, integral control and differential control to the correction error.

The final control amount may be determined based on a basic control amount for following the target torque and the balancing control compensation amount.

The basic control amount may include a feedback control amount and a feed forward control amount, for following the target torques.

The start condition and end condition of the preliminary activation signal may be set differently from each other.

The start condition and end condition of the main activation signal may be set differently from each other.

According to various exemplary embodiments of the present disclosure, a method of controlling a twin clutch includes: detecting, by a driving information detection unit, driving information necessary for driving a vehicle; determining, by a clutch controller, amounts of target torques applied to respective clutches included in a twin clutch, based on the detected driving information; determining, by the clutch controller, a correction error based on a difference between actual torques applied to the respective clutches included in the twin clutch when a preliminary activation signal is turned on based on the amounts of the target torques and a main activation signal is turned on based on the actual torques applied to the respective clutches; determining, by the clutch controller, a balancing control compensation amount based on the correction error; determining, by the clutch controller, final control amounts applied to the respective clutches based on the balancing control compensation amount; and controlling, by the clutch controller, the respective clutches based on the final control amount.

The balancing control compensation amount may be determined applying one or more of proportional control, integral control and differential control to the correction error.

The final control amount may be determined based on a basic control amount for following the target torque and the balancing control compensation amount.

The basic control amount may include a feedback control amount and a feed forward control amount, for following the target torques.

The start condition and end condition of the preliminary activation signal may be set differently from each other.

The start condition and end condition of the main activation signal may be set differently from each other.

According to the apparatus of controlling a twin clutch and a method thereof according to the exemplary embodiments of the present disclosure as described above, it is possible to secure the stable straight-line driving performance by controlling the hydraulic pressures (or torques) applied to the respective clutches by use of the final control amount determined based on the target torques applied to the respective clutches included in the twin clutch and the actual torques applied to the respective clutches.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 3A, FIG. 3B, FIG. 3C, FIG. 4A, FIG. 4B, FIG. 4C, FIG. 4D, FIG. 4E, and FIG. 4F are graphs for explaining operations of the twin clutch according to various exemplary embodiments of the present disclosure.

Figure 1:
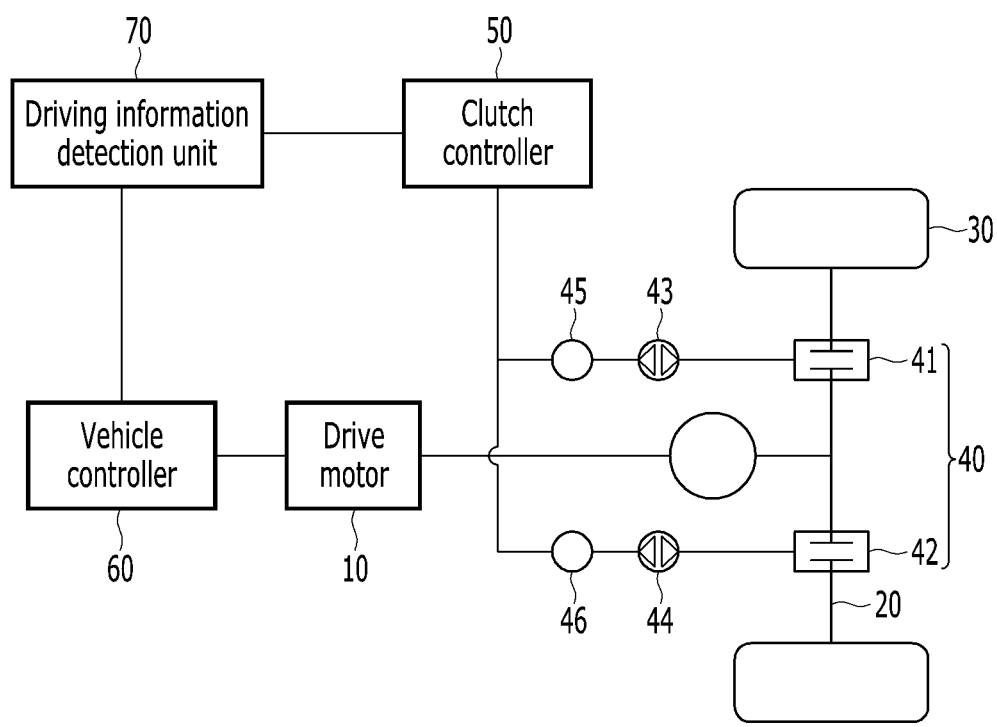
FIG. 1 is a conceptual diagram showing a configuration of an apparatus of controlling a twin clutch according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Exemplary embodiments of the present disclosure will be described more fully hereinafter with reference to the accompanying drawings, in which exemplary embodiments of the present disclosure are shown. As those skilled in the art would realize, the described embodiments may be modified in various different ways, all without departing from the spirit or scope of the present disclosure.

A portion unrelated to the description is omitted to obviously describe the present disclosure, and the same or similar components are denoted by the same reference numeral throughout the present specification.

Hereinafter, an apparatus of controlling a twin clutch according to various exemplary embodiments of the present disclosure is described in detail with reference to the accompanying drawings.

FIG. 1 is a conceptual diagram showing a configuration of an apparatus of controlling a twin clutch according to various exemplary embodiments of the present disclosure.

As shown in FIG. 1, the apparatus of controlling a twin clutch according to various exemplary embodiments of the present disclosure may include a drive motor 10, a vehicle controller 60, a twin clutch 40 and a clutch controller 50.

The drive motor 10 may provide drive power necessary for driving a vehicle by use of electrical energy, and the drive power generated by the drive motor 10 may be supplied to the drive wheels 30 or all wheels of the vehicle to drive the vehicle.

The twin clutch 40 may include a first clutch 41 and a second clutch 42 provided on both sides of an axle 20 mounted on the drive wheel 30.

The drive power supplied from the drive motor 10 to the drive wheel 30 may be supplied to or blocked from the drive wheel 30, based on the engagement and disengagement of the twin clutch 40.

Each clutch included in the twin clutch 40 may include a clutch plate and a clutch disc, and the clutch plate and the clutch disc may be engaged with each other by hydraulic pressures generated by hydraulic pumps 43 and 44 operated by hydraulic motors 45 and 46.

That is, the engagement of the clutch may be achieved when the clutch plate and the clutch disc are engaged with each other by the hydraulic pressures generated by the hydraulic pumps 43 and 44.

On the other hand, the disengagement of the clutch may be achieved when the clutch plate and the clutch disc are disengaged from each other by no hydraulic pressure generated by the hydraulic pump 43 or 44.

In various exemplary embodiments of the present disclosure, it is possible to control torques applied to the respective clutches by independently adjusting magnitudes of the hydraulic pressures applied to the respective clutches included in the twin clutch 40.

It is possible to adjust a magnitude of the drive power distributed to the drive wheel 30 through the clutch by independently controlling the torques applied to the respective clutches.

The magnitudes of the hydraulic pressures generated by the hydraulic pumps 43 and 44 and applied to the respective clutches may be mapped to the torques applied to the respective clutches.

The torque applied to the clutch, based on the magnitude of the hydraulic pressure, may be determined by an experiment and stored in the clutch controller 50 in advance.

The clutch controller 50 may independently control the engagement and disengagement of the twin clutch 40, and distribute the drive power supplied to the drive wheel 30 through the twin clutch 40 when necessary, allowing the vehicle to be stably driven during a turning driving or when either wheel slips. That is, the clutch controller 50 may adjust an engagement force (or torque) of the clutches provided on both the sides of the axle 20 to adjust the torque of the drive wheels 30 respectively provided on both the sides of the axle 20, allowing the vehicle to be stably driven even during a turning driving or when either wheel slips.

The vehicle controller 60 may control various components necessary for driving the vehicle, including the drive motor 10, and perform cooperative control with the clutch controller 50 when necessary.

The clutch controller 50 and the vehicle controller 60 may be implemented as being integrated with each other or independent (or separate) from each other.

In the specification of the present disclosure, the clutch controller 50 and the vehicle controller 60 are implemented independently from each other as an example.

The clutch controller 50 and the vehicle controller 60 may be provided as one or more processors operated by a set program, and the set program may perform each step of a method of controlling the twin clutch 40 according to various exemplary embodiments of the present disclosure.

Meanwhile, an electric vehicle including the twin clutch 40 according to various exemplary embodiments of the present disclosure may include a driving information detection unit 70 that detects driving information necessary for driving the vehicle, and the driving information detected by the driving information detection unit 70 may be transmitted to the clutch controller 50 and the vehicle controller 60.

The driving information is for determining a straight-line driving state of the vehicle, and may include a steering angle of a steering wheel, a lateral acceleration of the vehicle, or a yaw rate of the vehicle. Furthermore, the driving information may include the hydraulic pressure (or torque) applied to the first clutch 41 or second clutch 42 of the twin clutch 40.

To the present end, the driving information detection unit 70 may include a steering angle sensor of the steering wheel, which detects a turning state (or straight-line driving state) of the vehicle, a lateral acceleration sensor which measures the lateral acceleration of the vehicle or a yaw rate sensor which detects a yaw rate of the vehicle. Furthermore, the driving information detection unit 70 may include a pressure sensor which measures the hydraulic pressure applied to the first clutch 41 or the second clutch 42. The driving information detected by the driving information detection unit 70 may be transmitted to the clutch controller 50 and/or the vehicle controller 60. Furthermore, the driving information detection unit may include a hydraulic pressure sensor which detects the hydraulic pressures applied to the respective clutches included in the twin clutch 40 or a torque sensor which detects the torques applied to the respective clutches included in the twin clutch 40.

Hereinafter, a method of controlling the above-described twin clutch 40 according to various exemplary embodiments of the present disclosure is described in detail with reference to the accompanying drawings.

Figure 2:
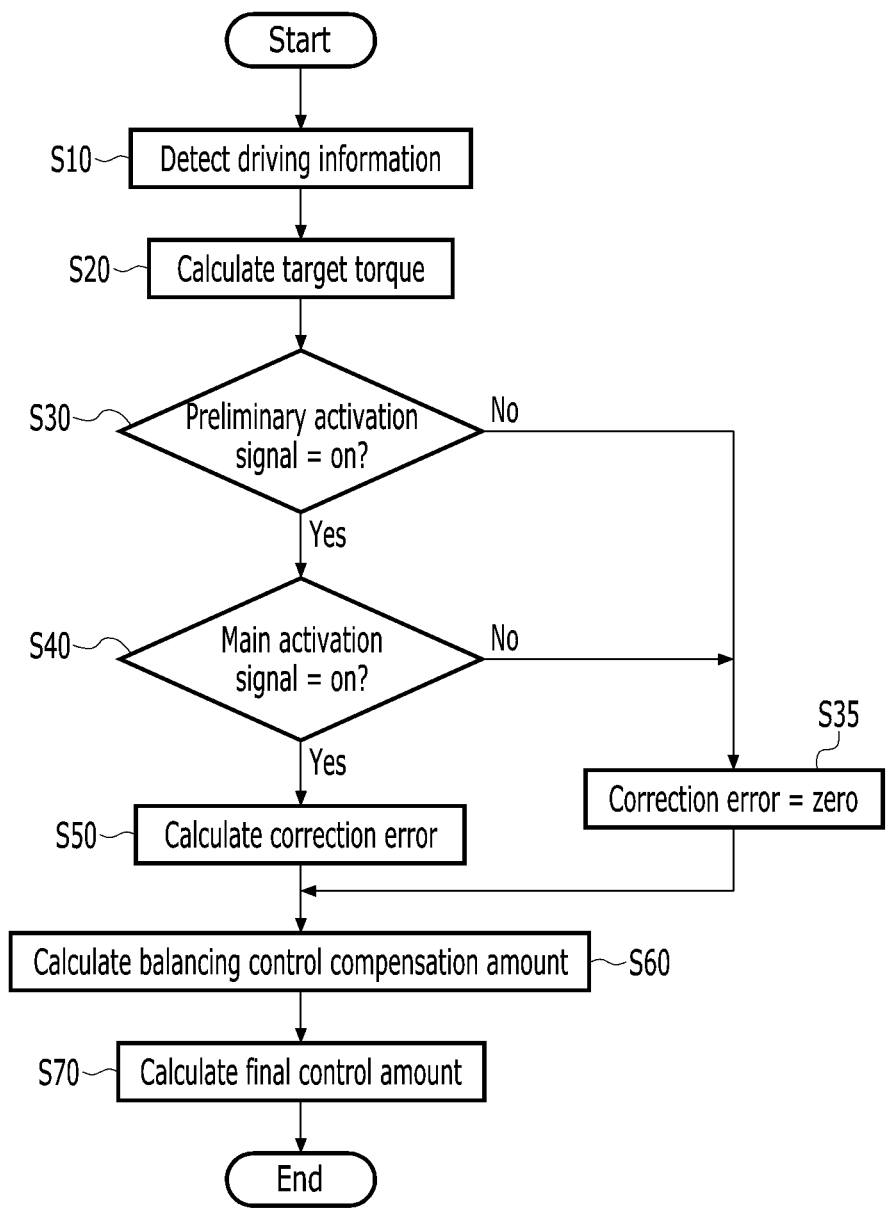
FIG. 2 is a flowchart showing a method of controlling a twin clutch according to various exemplary embodiments of the present disclosure.

FIG. 2 is a flowchart showing the method of controlling a twin clutch according to various exemplary embodiments of the present disclosure.

Referring to FIG. 2, the driving information detection unit 70 may detect the driving information necessary for driving a vehicle, and transmit the detected driving information to the clutch controller 50 (S10). Here, the driving information detected by the driving information detection unit 70 is the same as described above, and a detailed description thereof is thus omitted.

The clutch controller 50 may determine target torques applied to the respective clutches included in the twin clutch 40, based on the detected driving information (S20).

For example, when a driver positions the steering wheel in the center, the steering angle of the steering wheel detected by the steering angle sensor may be zero degrees. Furthermore, when the driver rotates the steering wheel to the left as much as possible to make a left turn, the steering angle of the steering wheel detected by the steering angle sensor may be −360 degrees. On the other hand, when the driver rotates the steering wheel to the right as much as possible to make a right turn, the steering angle of the steering wheel detected by the steering angle sensor may be +360 degrees.

The clutch controller 50 may adjust the hydraulic pressure applied to the first clutch 41 or the second clutch 42, based on a size of the steering angle, adjusting a magnitude of the torque applied to the first clutch 41 or the second clutch 42.

The clutch controller 50 may determine whether the preliminary activation signal for a torque balancing control, which is determined based on a difference between the target torques applied to the respective clutches, is turned on (S30).

The preliminary activation signal for the torque balancing control may be turned on when the difference between the target torques applied to the respective clutches is within a threshold torque, and turned off when the difference between the target torques applied to the respective clutches is out of the threshold torque.

Graph of FIG. 3A shows the target torques of the first clutch 41 (e.g., left clutch) and the second clutch 42 (e.g., right clutch), graph of FIG. 3B shows the difference between the target torques of the first clutch 41 and the second clutch 42, and graph of FIG. 3C shows the preliminary activation signal based on the difference between the target torques.

When the difference between the target torques is within the threshold torque, the clutch controller 50 may determine that the driver intends the straight-line driving or a drift mode during the turning driving. Accordingly, when the driver intends the straight-line driving or only in the drift mode during the turning driving of the vehicle, performed is the torque balancing control for correcting amounts of the torques, applied to the first clutch 41 (e.g., left clutch, and see 'LH' in graph of FIG. 3A) and the second clutch 42 (e.g., right clutch, and see 'RH' in graph of FIG. 3A), according to various exemplary embodiments of the present disclosure. In other words, when the difference between the target torques is within the threshold torque, the preliminary activation signal for performing the torque balancing control may be turned on.

Here, a start condition of the preliminary activation signal for performing the torque balancing control and an end condition of the preliminary activation signal for inactivating the torque balancing control may be set differently from each other.

For example, the start condition may be satisfied when the difference between the target torques applied to the respective clutches is less than a first threshold torque (see 'Enb_Th' in FIG. 3B). On the other hand, the end condition may be satisfied when the difference between the target torques applied to the respective clutches is greater than a second threshold torque (see 'Disb_Th' in FIG. 3B) greater than the first threshold torque.

In the present manner, it is possible to prevent the torque balancing control from being repeatedly performed unnecessarily by differently setting the start condition of the preliminary activation signal for performing the torque balancing control and the end condition.

The clutch controller 50 may set a correction error to zero when the preliminary activation signal for performing the torque balancing control is turned off (S35).

The clutch controller 50 may determine whether a main activation signal is turned on when the preliminary activation signal is turned on (S40).

In detail, the clutch controller 50 may detect actual torques applied to the respective clutches included in the twin clutch 40, and determine whether the main activation signal, which is determined based on a difference between amounts of the actual torques applied to the respective clutches, is turned on.

The main activation signal may be turned on when the difference between the amounts of the actual torques applied to the respective clutches is greater than or equal to that of a reference torque. On the other hand, the main activation signal may be turned off when the difference between the amounts of the actual torques applied to the respective clutches is within that of the reference torque (see graphs in FIGS. 4A and 4B).

For example, the main activation signal may be turned on when the difference between the amounts of the actual torques, applied to the first clutch 41 (e.g., left clutch, and see 'LH' in graph in FIG. 4A) and the second clutch 42 (e.g., right clutch, and see 'RH' in graph in FIG. 4A), is greater than or equal to that of the reference torque.

Here, a start condition of the main activation signal for performing the torque balancing control and an end condition of the main activation signal for inactivating the torque balancing control may be set differently from each other.

For example, the start condition may be satisfied when the difference between the amounts of the actual torques applied to the respective clutches is greater than or equal to that of a first reference torque (see 'Enb_Th1' in FIG. 4). On the other hand, the end condition may be satisfied when the difference between the amounts of the actual torques applied to the respective clutches is less than that of a second reference torque (see 'Disb_Th1' in FIG. 4).

In the present manner, it is possible to prevent the torque balancing control from being repeatedly ended unnecessarily after the torque balancing control is started by differently setting the start condition for performing the torque balancing control and the end condition.

The clutch controller 50 may set the correction error to zero when the main activation signal for performing the torque balancing control is turned off (S35).

The clutch controller 50 may perform the torque balancing control when the main activation signal is turned on.

Figures 4A, 4B, 4C:
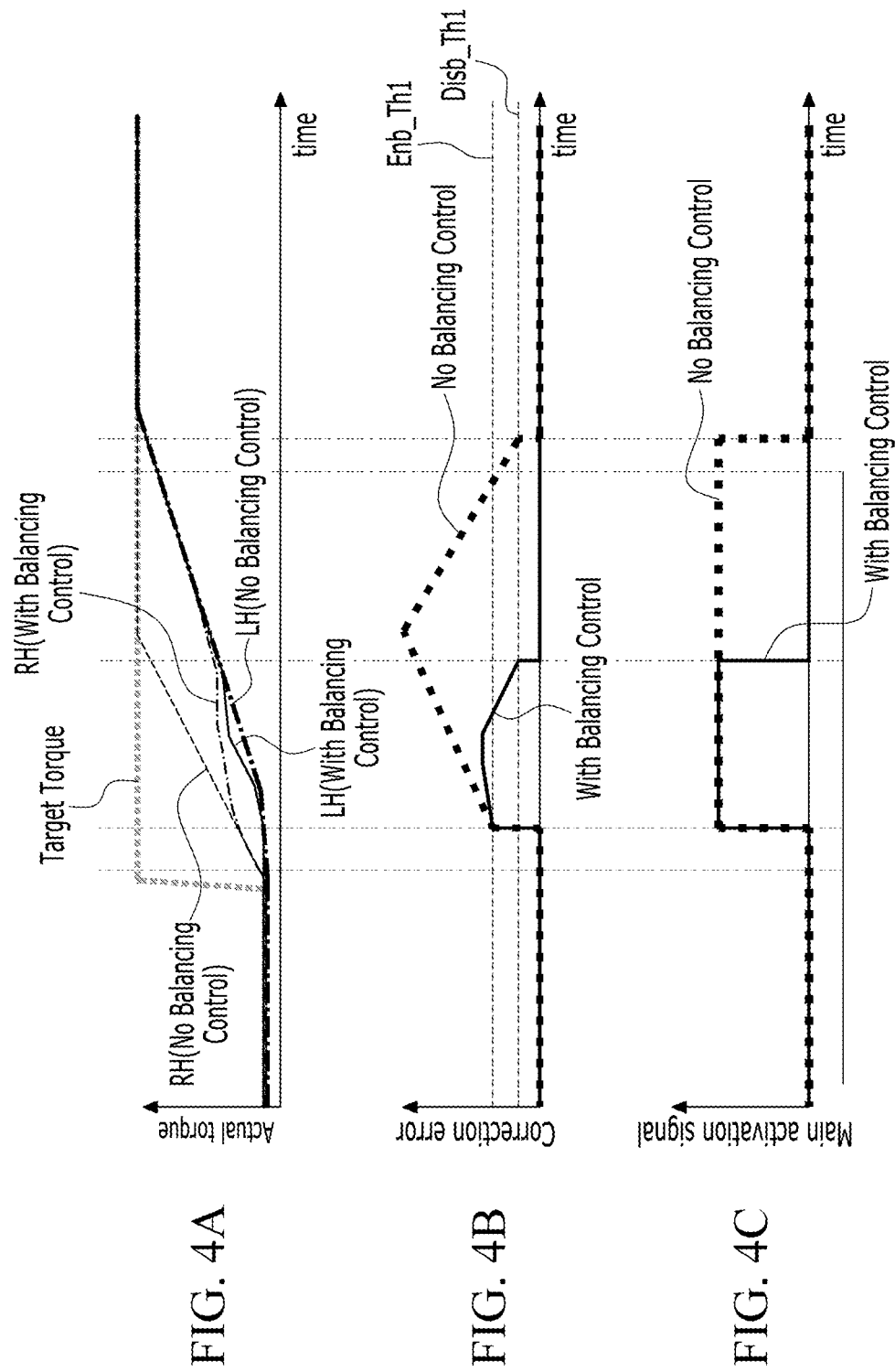

In detail, the clutch controller 50 may determine the correction error, based on the difference in the actual torques applied to the respective clutches (S50) (see graph in FIG. 4B).

The correction error may be determined using Equation 1 below.

$$e_{tq\_Balancing} = T_{qLH\_Measure} - T_{qRH\_Measure}$$ [Equation 1]

In Equation 1, $e_{tq\_Balancing}$ may indicate the correction error, $T_{qLH\_Measure}$ may indicate the actual torque applied to the first clutch 41 (e.g., left clutch), and $T_{qRH\_Measure}$ may indicate the actual torque applied to the second clutch 42 (e.g., right clutch).

The clutch controller 50 may determine a balancing control compensation amount based on the correction error (S60). Here, the balancing control compensation amount may indicate a compensation amount for performing the torque balancing control (see graph in FIG. 4D). The clutch controller 50 may determine the compensation amount by use of proportional-integral-differential (PID) controls. That is, the balancing control compensation amount may be determined using one or more of the proportional control, the integral control and the differential control. The balancing control compensation amount may be determined using Equation 2 below.

$$U_{Balancing} = K_p \cdot e_{tq\_Balancing} + \int K_i \cdot d(e_{tq\_Balancing}) + K_d \cdot \frac{d(e_{tq\_Balancing})}{dt}$$ [Equation 2]

In Equation 2, $U_{Balancing}$ may indicate the balancing control compensation amount, $K_p \cdot e_{tq\_Balancing}$ may indicate a proportional control amount, $\int K_i \cdot e_{tq\_Balancing}$ may indicate an integral control amount, and $$K_d \cdot \frac{d(e_{tq\_Balancing})}{dt}$$

may indicate a differential control amount.

Figures 4D, 4E, 4F:
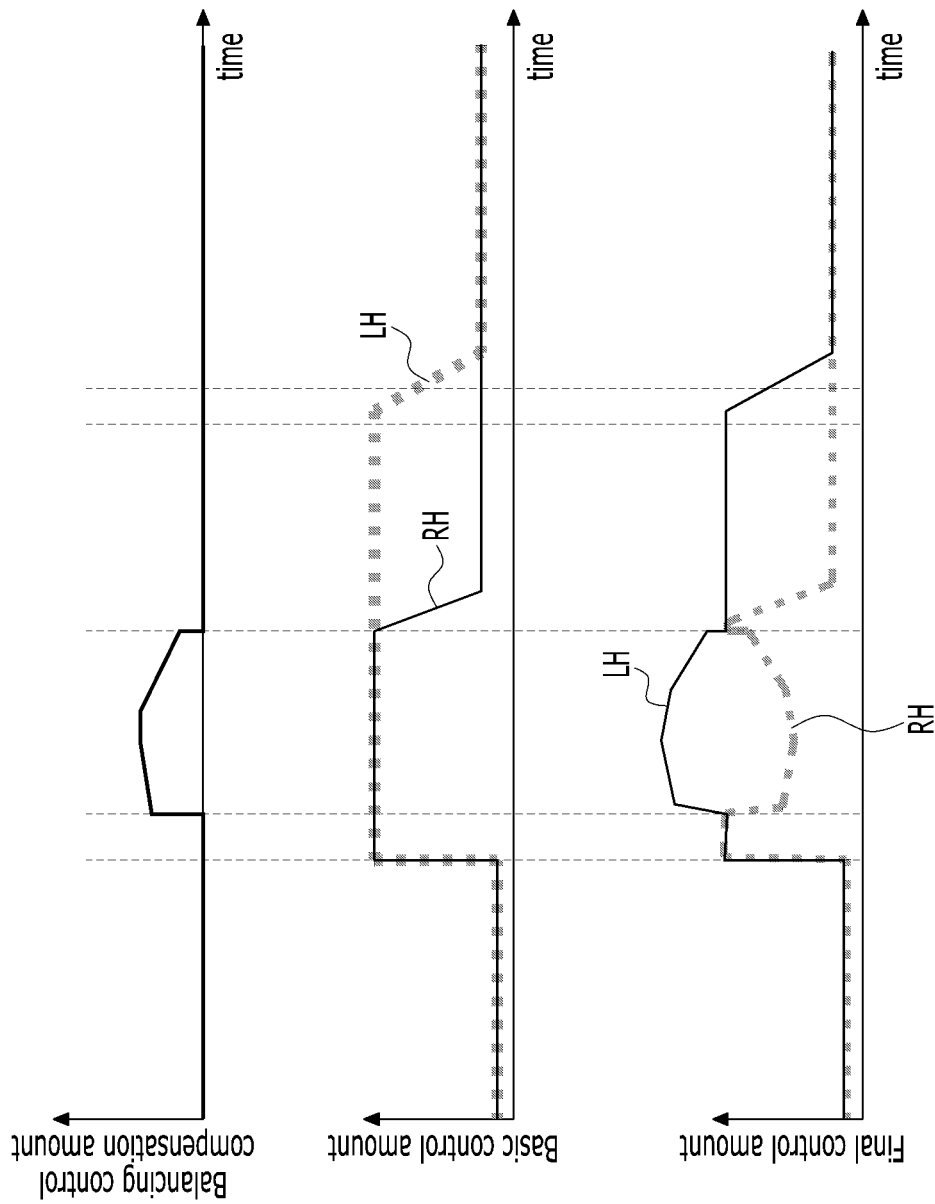

The clutch controller 50 may determine final control amounts applied to the respective clutches based on the balancing control compensation amount and a basic control amount for following the target torque (S70) (see graph in FIG. 4F). Here, the basic control amount may indicate a control duty value controlling the hydraulic motor to estimate the target torque.

The final control amount may be determined based on the basic control amount for following the target torque and the balancing control compensation amount. The basic control amount may include a feedback control amount and a feed forward control amount, for following the target torques. The final control amount may be determined using Equations 3 and 4 below.

$$U_{req\_LH} = U_{feedforward\_LH} + U_{feedback\_LH} - U_{Balancing}$$ [Equation 3]

In Equation 3, $U_{req\_LH}$ may indicate the final control amount of the first clutch 41 (e.g., left clutch), $U_{feedforward\_LH}$ may indicate the feed forward control amount for following the target torque of the first clutch 41, and $U_{feedback\_LH}$ may indicate the feedback control amount for following the target torque thereof.

$$U_{req\_RH} = U_{feedforward\_RH} + U_{feedback\_RH} - U_{Balancing}$$ [Equation 4]

In Equation 4, $U_{req\_RH}$ may indicate the final control amount of the second clutch 42 (e.g., right clutch), $U_{feedward\_RH}$ may indicate the feed forward control amount for following the target torque of the second clutch 42, and $U_{feedback\_RH}$ may indicate the feedback control amount for following the target torque of the second clutch 42.

The clutch controller 50 may secure the straight-line driving performance of the vehicle by controlling the hydraulic pressures (or torques) applied to the first clutch 41 and second clutch 42 of the twin clutch 40 by use of the final control amount determined in Equations 3 and 4.

According to various exemplary embodiments of the present disclosure as described above, it is possible to secure the straight-line driving performance of the vehicle by determining the final control amounts applied to the respective clutches based on the target torques applied to the respective clutches included in the twin clutch and the actual torques applied to the respective clutches, and by controlling the hydraulic pressures (or torques) applied to the respective clutches through the final control amount.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus of controlling a twin clutch, the apparatus including:
    the twin clutch that selectively blocks power supplied from a drive motor to a pair of drive wheels of a vehicle;
    a driving information detection unit that is configured to detect a straight-line driving state of the vehicle; and
    a controller that is configured to control the twin clutch by determining target torques applied to respective clutches included in the twin clutch, based on the straight-line driving state detected by the driving information detection unit, to determine a correction error based on a difference between actual torques applied to the respective clutches included in the twin clutch when a preliminary activation signal, which is determined based on the target torques, is turned on and a main activation signal, which is determined based on the actual torques applied to the respective clutches, is turned on, to determine a balancing control compensation amount based on the correction error, and to determine final control amounts applied to the respective clutches based on the balancing control compensation amount.

2. The apparatus of claim 1, wherein the balancing control compensation amount is determined applying one or more of proportional control, integral control and differential control to the correction error.

3. The apparatus of claim 1, wherein the final control amounts are determined based on a basic control amount for following the target torques and the balancing control compensation amount.

4. The apparatus of claim 3, wherein the basic control amount includes a feedback control amount and a feed forward control amount, for following the target torques.

5. The apparatus of claim 1, wherein a start condition and an end condition of the preliminary activation signal are set differently from each other.

6. The apparatus of claim 1, wherein a start condition and an end condition of the main activation signal are set differently from each other.

7. The apparatus of claim 1, wherein the preliminary activation signal is turned on when a difference between the target torques applied to the respective clutches is within a threshold torque.

8. The apparatus of claim 1, wherein the main activation signal is turned on when a difference between the amounts of the actual torques applied to the respective clutches is greater than or equal to a reference torque.

9. A method of controlling a twin clutch, the method comprising:
- detecting, by a driving information detection unit, driving information necessary for driving a vehicle;
- determining, by a controller, amounts of target torques applied to respective clutches included in the twin clutch, based on the detected driving information;
- determining, by the controller, a correction error based on a difference between actual torques applied to the respective clutches included in the twin clutch when a preliminary activation signal is turned on based on the amounts of the target torques and a main activation signal is turned on based on the actual torques applied to the respective clutches;
- determining, by the controller, a balancing control compensation amount based on the correction error;
- determining, by the controller, final control amounts applied to the respective clutches based on the balancing control compensation amount; and
- controlling, by the controller, the respective clutches based on the final control amounts.

10. The method of claim 9, wherein the balancing control compensation amount is determined applying one or more of proportional control, integral control and differential control to the correction error.

11. The method of claim 9, wherein the final control amounts are determined based on a basic control amount for following the target torques and the balancing control compensation amount.

12. The method of claim 11, wherein the basic control amount includes a feedback control amount and a feed forward control amount, for following the target torques.

13. The method of claim 9, wherein a start condition and an end condition of the preliminary activation signal are set differently from each other.

14. The method of claim 9, wherein a start condition and an end condition of the main activation signal are set differently from each other.

15. The method of claim 9, wherein the preliminary activation signal is turned on when a difference between the target torques applied to the respective clutches is within a threshold torque.

16. The method of claim 9, wherein the main activation signal is turned on when a difference between the amounts of the actual torques applied to the respective clutches is greater than or equal to a reference torque.

* * * * *